Feb. 21, 1961 G. R. WOOD, SR 2,972,240
MARINE COUPLING
Filed Nov. 6, 1959 2 Sheets-Sheet 1
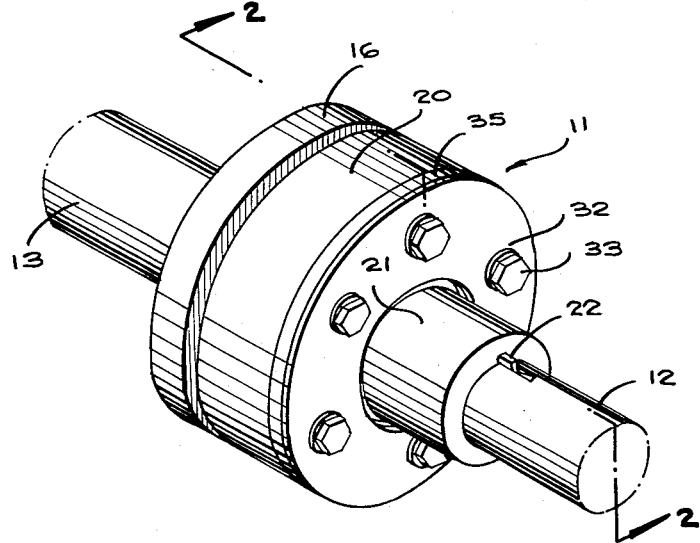
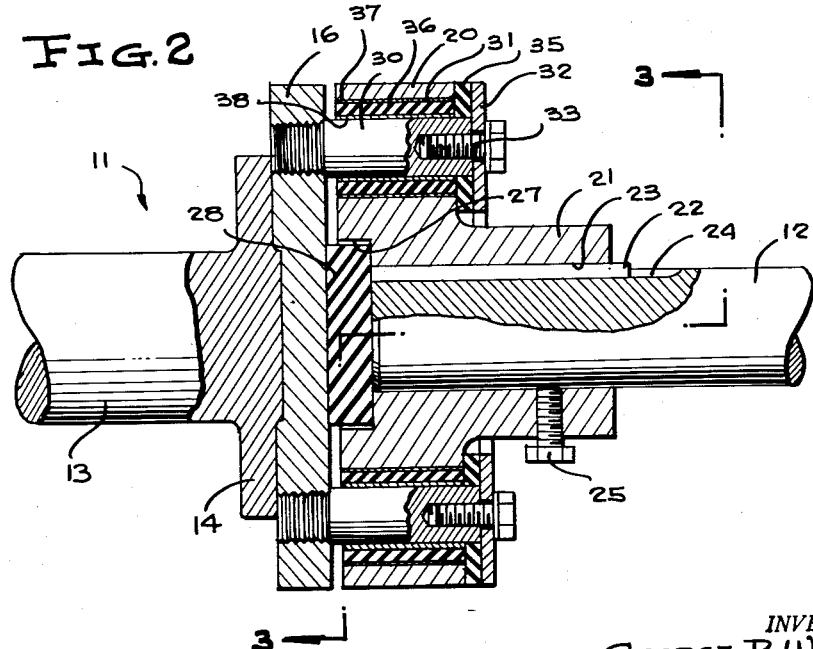
INVENTOR.
GEORGE R. WOOD, SR.
BY
McMorrow, Berman & Davidson
ATTORNEYS Feb. 21, 1961 G. R. WOOD, SR 2,972,240
MARINE COUPLING
Filed Nov. 6, 1959 2 Sheets-Sheet 2
Fig. 3
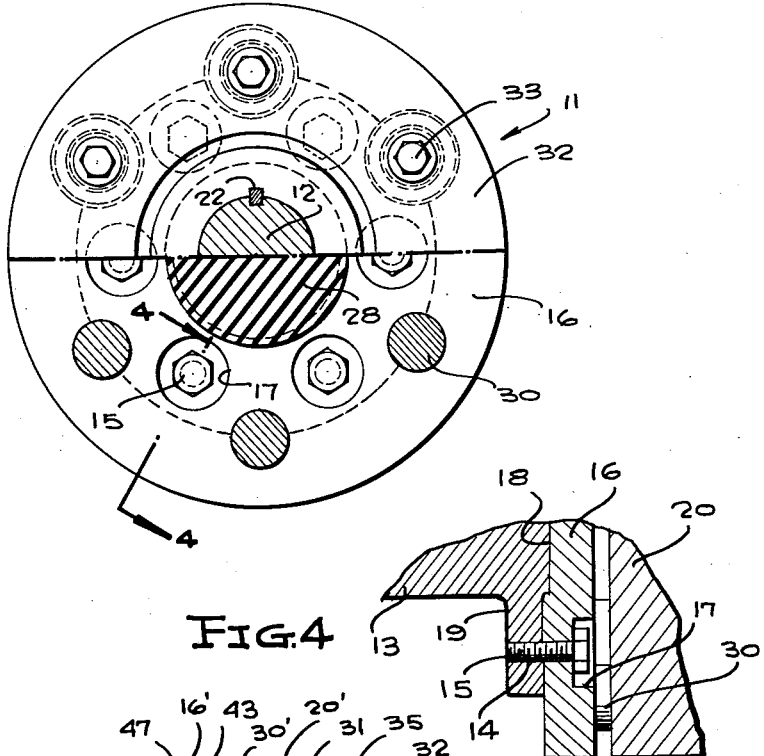
Fig. 4
Fig. 5
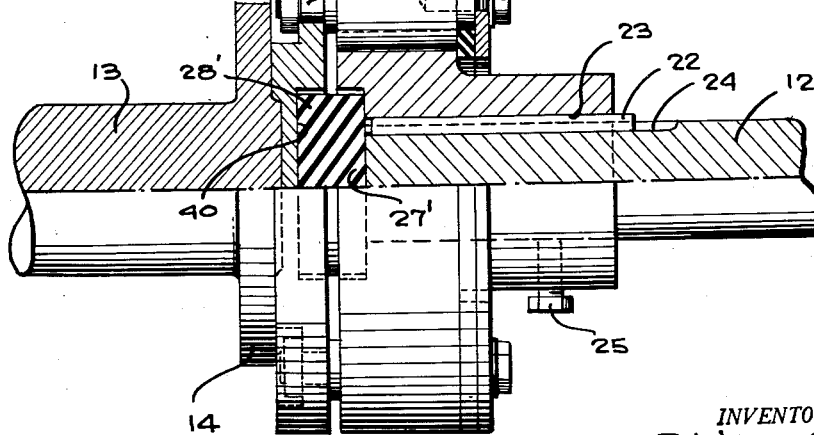
INVENTOR.
GEORGE R. WOOD, SR.
BY
McMorrow, Berman + Davidson
ATTORNEYS

United States Patent Office 2,972,240
Patented Feb. 21, 1961

2,972,240

MARINE COUPLING

George R. Wood, Sr., P.O. Box 141, Fairhope, Ala.

Filed Nov. 6, 1959, Ser. No. 851,314

3 Claims. (Cl. 64—10)

This invention relates to shaft coupling assemblies, and more particularly to a coupling assembly adapted to couple a marine propeller shaft to an engine or other power source.

A main object of the invention is to provide a novel and improved shaft coupling assembly which involves relatively simple components, which is easy to assemble, and which is arranged to transmit both forward thrust or reverse pull without distortion or adverse effects, whereby it is particularly suitable for use in coupling a marine propeller shaft to an engine or similar power source.

A further object of the invention is to provide an improved coupling assembly for connecting a marine propeller shaft to an engine or other power source, the assembly being sufficiently flexible to compensate for slight angular misalignment between the driving and driven shaft elements thereof, being arranged to urge the driving and driven shafts into proper alignment, being provided with means to mechanically and electrically insulate the propeller shaft from the engine shaft, being easy to take apart and reassemble, providing cushioned transmission of torque and thrust from the engine to the propeller shaft, being sturdy in construction, compact in size, easy to manufacture, and easy to install.

Further objects and advantages of the invention will become apparent from the following description and claims, and from the accompanying drawings, wherein:

Figure 1 is a perspective view of an improved shaft coupling assembly constructed in accordance with the present invention.

Figure 2 is an enlarged vertical cross sectional view taken on the line 2—2 of Figure 1.

Figure 3 is a transverse vertical cross sectional view taken substantially on the line 3—3 of Figure 2.

Figure 4 is a cross sectional detail view taken on the line 4—4 of Figure 3.

Figure 5 is a side elevational view, partly in longitudinal cross section, of a modified form of shaft coupling assembly constructed in accordance with the present invention.

Referring to the drawings, and more particularly to Figures 1 to 4, 11 generally designates an improved shaft coupling assembly particularly adapted for connecting a marine propeller shaft 12 to the shaft 13 of an engine or other suitable power source. The engine shaft 13 is provided with an integral coupling flange 14, and secured to the coupling flange 14, as by a plurality of circularly arranged fastening bolts 15, is a first circular coupling plate 16.

As shown in Figure 4, the coupling plate 16 is provided with the circular recesses 17 which receive the heads of the fastening bolts 15, said bolts extending through the plate 16 and being threadedly engaged in the engine shaft connecting flange 14. The coupling plate 16 is formed with a circular recess 18 which receives a circular boss 19 integrally formed on the central portion of the circular end member 14 associated with the engine shaft 13.

Alternatively, the bolts 15 may extend through suitable bolt holes provided in the flange 14 and be secured thereto by clamping nuts threaded on the ends of the bolts and clampingly engaging said flange.

Designated at 20 is a second coupling plate, of substantial thickness, said coupling plate being integrally formed with a sleeve portion 21 in which the end of the propeller shaft 12 is secured. As shown in Fig. 2, the shaft 12 is keyed to the sleeve 21 and plate member 20 by a longitudinal key 22 engaged in opposing keyways 23 and 24 formed respectively in the member 21 (and the plate member 20) and the shaft 12. The sleeve portion 21 is provided with one or more set screws 25 which are lockingly engageable with the propeller shaft 12.

Alternatively, sleeve 21 may be split longitudinally and may be provided with respective clamping bolts connecting the adjacent end portions of the split segments and engaging suitable notches provided therefor in shaft 12. Thus, the propeller shaft 12 may be rigidly secured in the shaft-receiving sleeve 21 and coupling plate 20.

The coupling plate 20 is integrally formed around the central bore axis thereof with an annular recess 27 which faces the coupling plate 16, as shown in Figure 2, and in which is seated a circular pad member 28 of suitable cushioning material, such as rubber or other suitable resilient deformable material.

A plurality of coupling pins 30 are threadedly engaged in the marginal portion of the circular plate 16, being evenly spaced around the axis of the plate and extending through corresponding openings 31 formed in the marginal portion of the second circular coupling plate 20. Designated at 32 is an annular connecting plate which is engaged against the ends of the coupling pins 30 and which is secured thereto by respective fastening bolts 33 extending through openings provided therefor in the annular plate 32 and threadedly engaged axially in the coupling pins 30. The inner peripheral edge of the retaining plate 32 is spaced outwardly from the sleeve 21 sufficiently to allow substantial angling of shaft 12 with respect to shaft 13. Interposed between the plate 32 and the adjacent surface of the second coupling plate 20 is an annular cushioning pad 35 of resilient deformable material, such as rubber, or the like.

Surrounding the coupling pins 30 and interposed between said pins and the bores 31 provided therefor in the second coupling plate 20 are respective cushioning sleeves 36 of resilient deformable material, such as rubber or the like, the cushioning sleeves being contained between respective concentric thin metal retaining sleeves 37 and 38, as shown in Figure 2.

The parts are designed so that pad member 28 and cushion ring 35 are in firm contact with their respective bearing surfaces, without excessive end play. However, pad 28 and cushion ring 35 are sufficiently yieldable to allow a reasonable amount of angular deviation of the propeller shaft 12 with respect to driving shaft 13. As will be readily apparent, due to the resiliency of the pad and ring, such deviations are cushioned and absorbed. Pad 28 also acts to center forward propeller thrust substantially at the center of driving shaft 13, thereby relieving the other parts of the coupling of all thrust strain.

Similarly, the cushioning sleeves 36 are sufficiently resilient to absorb and compensate for slight angular misalignments which may exist between the propeller shaft and the driving shaft 13.

The coupling assembly above described is thus arranged to transmit both forward thrust or reverse pull from the propeller shaft 12 to the driving shaft 13, with sufficient flexibility whereby normal operation of the assembly with slight angular misalignment between the shaft elements 12 and 13 causes no strain or injury to either.

Furthermore, the resilient members 28, 30, 35, and 36, being made of non-conducting material, mechanically and electrically insulate the propeller shaft 12 from the engine shaft 13, and serve as a shock-absorbing means to cushion the transmission of torque from the engine shaft to the propeller shaft.

The cushion ring 35 may be permanently bonded or vulcanized to the reverse thrust plate 32, to prevent radial distortion due to high speed.

As shown in Figure 2, the propeller shaft 12 is preferably secured in a position wherein its end is in direct abutment with the cushion pad 28.

In the modified form of the invention shown in Figure 5, the first coupling plate, designated at 16′, is formed with a central circular recess 40 in which a substantial portion of the cushioning pad, shown at 28′, is received. The recess 40 is preferably substantially the same in depth as the opposing recess provided in the second coupling plate 20′, said opposing recess being shown at 27′.

As shown in Figure 5, instead of being threaded directly into the first coupling plate, the coupling pins, shown at 30′, may be provided with reduced end portions 42 which engage through apertures 43 provided in the marginal portion of the first coupling plate 16′ and which are further formed with reduced threaded ends 44 which project into circular recesses 45 formed in the opposite side of the coupling plate 16′. Fastening nuts 47 are threadedly engaged on the threaded portions 44 and clampingly secure the pins 30′ to the coupling plate 16′ in the manner clearly illustrated in Figure 5. The arrangement illustrated in Figure 5 provides for the use of a substantially thicker cushioning pad between the coupling plates than that employed in the first-described form of the invention, as well as for more positive centering of the cushioning pad between the coupling plates.

While certain specific embodiments of an improved coupling assembly for coupling a marine propeller shaft to an engine or other source of power have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A shaft coupling assembly of the character described comprising a driving shaft member, a first coupling plate secured to said driving shaft member, a driven shaft member axially aligned with said driving shaft member, a second coupling plate secured to said driven shaft member adjacent and parallel to said first coupling plate, a pad element of resilient deformable material interposed between said coupling plates, a plurality of coupling pins rigidly secured to the outer marginal portions of said first coupling plate and extending through the outer marginal portions of said second coupling plate, an annular retaining plate surrounding said driven shaft member with the second coupling plate disposed between said retaining plate and the first coupling plate, the inner peripheral edge of said retaining plate being spaced outwardly from said driven shaft member sufficiently to allow substantial angling of said driven shaft member with respect to said driving shaft member, means securing said retaining plate to the ends of the coupling pins, and deformable resilient cushioning sleeves surrounding said coupling pins and cushioning said coupling pins with respect to said second coupling plate.

2. A shaft coupling assembly of the character described comprising a driving shaft member, a first coupling plate secured to said driving shaft member, a driven shaft member substantially in axial alignment with said driving shaft member, a second coupling plate secured to said driven shaft member adjacent and substantially parallel to said first coupling plate, a pad element of resilient deformable material interposed between said coupling plates, a plurality of coupling pins rigidly secured to the outer marginal portions of said first coupling plate and extending through the outer marginal portions of said second coupling plate, an annular retaining plate surrounding said driven shaft member with the second coupling plate disposed between said retaining plate and the first coupling plate, the inner peripheral edge of said retaining plate being spaced outwardly from said driven shaft member sufficiently to allow substantial angling of said driven shaft member with respect to said driving shaft member, means securing said retaining plate to the ends of the coupling pins, deformable resilient cushioning sleeves surrounding said coupling pins and cushioning said coupling pins with respect to said second coupling plate, and a cushioning plate of resilient deformable material interposed between said retaining plate and said second coupling plate.

3. A shaft coupling assembly of the character described comprising a driving shaft member, a first coupling plate secured to said driving shaft member, a driven shaft member substantially in axial alignment with said driving shaft member, a second coupling plate secured to said driven shaft member adjacent and substantially parallel to said first coupling plate, said second coupling plate being formed with a recess facing said first coupling plate, a pad element of resilient deformable material seated in said recess and interposed between said coupling plates, a plurality of coupling pins rigidly secured to the outer marginal portions of said first coupling plate and extending through the outer marginal portions of said second coupling plate, an annular retaining plate surrounding said driven shaft member with the second coupling plate disposed between said retaining plate and the first coupling plate, the inner peripheral edge of said retaining plate being spaced outwardly from said driven shaft member sufficiently to allow substantial angling of said driven shaft member with respect to said driving shaft member, means securing said retaining plate to the ends of the coupling pins, deformable resilient cushioning sleeves surrounding said coupling pins and cushioning said coupling pins with respect to said second coupling plate, and a cushioning plate of resilient deformable material interposed between said retaining plate and said second coupling plate.

References Cited in the file of this patent
UNITED STATES PATENTS 2,220,622     Homer                 Nov. 5, 1940